United States Patent [19]

Studinger

[11] 4,133,232
[45] Jan. 9, 1979

[54] LATHE TURRET

[75] Inventor: Ernst Studinger, Berlin-Lichterfelde-Ost, Fed. Rep. of Germany

[73] Assignee: Carl Hasse & Wrede GmbH, Berlin, Fed. Rep. of Germany

[21] Appl. No.: 776,926

[22] Filed: Mar. 11, 1977

[30] Foreign Application Priority Data

Mar. 11, 1976 [DE] Fed. Rep. of Germany ....... 2610105

[51] Int. Cl.² .................... B23B 29/00; B23B 39/20
[52] U.S. Cl. ..................................... 82/36 A; 408/35
[58] Field of Search ..................... 82/36 A; 408/35

[56] References Cited

U.S. PATENT DOCUMENTS

| 431,107 | 7/1890 | Cowley | 408/35 |
|---|---|---|---|
| 1,227,486 | 5/1917 | Newman et al. | 82/36 A |
| 2,505,684 | 4/1950 | McClernon | 82/36 A |
| 2,685,122 | 8/1954 | Berthiez | 408/35 |
| 3,717,912 | 2/1973 | Lahm | 82/36 A |
| 3,955,257 | 5/1976 | Herbst et al. | 82/36 A |

*Primary Examiner*—Harrison L. Hinson
*Attorney, Agent, or Firm*—Edmund M. Jaskiewicz

[57] ABSTRACT

A turret for a lathe has a substantially circular turret member pivotally mounted in front of the head stock and a plurality of support surfaces are formed on the periphery of the turret member. The support surfaces are each inclined with respect to the axis of rotation of the turret member and tool supports are pivotally mounted on the support surfaces.

4 Claims, 3 Drawing Figures

LATHE TURRET

The present invention relates to a turrent for a lathe, more particularly, to the tool support structure on the turret.

In the use of a lathe for turning operations on materials including metal, wood, plastics and others, it was necessary for the lathe operator to replace by hand the various tools used for different metal working operations and also to manually control the feed. Such operations included turning, cutting off, boring, facing, and the cutting of threads both upon and within a piece of material. Since this procedure of inter-changing of tools and of manually controlling the feed was time consuming the turret lathe was developed. The turret lathe is particularly adapted for carrying out a limited number of repeated machining operations particularly on smaller work pieces. The turret lathe is provided with a multi-sided indexing tool holder or turret upon which as many as six to eight various tools are positioned. Once these tools have been adjusted into their proper positions and are clamped into these positions individual tools can be pivoted successively into their working position through a single operation.

The modern programmed machine tools including lathes should be capable of forming more complex shapes without any manual changing of tools. Various structures have been proposed in order to utilize more effectively such modern metal working machines. It has been proposed to provide a system wherein the tools are stored in magazines and are automatically changed so as to present the proper tool for a turning operation. While this magazine arrangement has the advantage of being able to employ an almost unlimited number of tools, there is the disadvantage that difficulties have been encountered in precisely positioning the clamped tools into their working positions after a tool has been released from the magazine. The precise positioning of the tools were particularly adversely affected by the presence of turnings or chips of metal or the material being worked and of sprayed water or coolant.

Another proposed system included a refinement of the turret principle wherein the tool stock is clamped in position as previously proposed with turrets and is merely pivoted out of the working position. While the turret overcomes the abovementioned problems with respect to precise positioning of the tools, the turret has the disadvantage of being limited to the number of tools which can be employed. It is not feasible to increase the number of working stations of a turret beyond a maximum of eight stations since otherwise one of the non-working tools would collide or otherwise interfere with the working of the work piece. Proposals have also been made to provide two additional turrets in order to increase the number of tools which can be employed. However, this arrangement also encountered problems with respect to interference with the work piece and also the plurality of turrets prevented the effective removal of chips or turnings.

It is therefore the principal object of the present invention to provide a novel and improved turret for a turret lathe.

It is another object of the present invention to provide such a turret where the number of stations for tool supports can be greater than eight.

A further object of the present invention is to provide such a turret wherein all of the tools are effectively and accurately clamped in working position while significantly decreasing or even eliminating the possibility of collision or interference with the work piece by the tools on the turret.

According to one aspect of the present invention there is provided a turret having a turret member which is pivotable in front of the head stock of the lathe. The turret member is provided with a plurality of inclined support surfaces on the external periphery of the turret member and tool supports are pivotally mounted on the support surfaces. The support surfaces may be each inclined at an angle of 45° with respect to the axis of rotation of the turret and the tool supports are mounted upon pivot pins which extend perpendicularly through the flat support surfaces so that the longitudinal axes of the tool supports each defines an angle of 45° with the pivot axis of its pivot pin.

The tool supports are spaced from each other on their respective support surfaces on the periphery of the turret member. Because of the angular relationship between the longitudinal axis of a tool support, the axis of the pivot pin and the axis of rotation of the turret member, it is now possible to provide more than eight tool supports on a turret member. On the external periphery of the turret member, the tool supports can be swung between a substantially horizontal working position for a horizontal lathe and an idle or inoperative position in which the tool support is positioned approximately 90° from its operative position. The tool support can be pivoted through an angle of half a revolution or less into its non-working or rest position. In this rest position the supports will be closely spaced from each other in a layered or aligned relationship without any reciprocal collision or interference with the work piece. According to the present embodiment of the invention eighteen support surfaces can be provided on the turret member for a corresponding number of tool supports.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
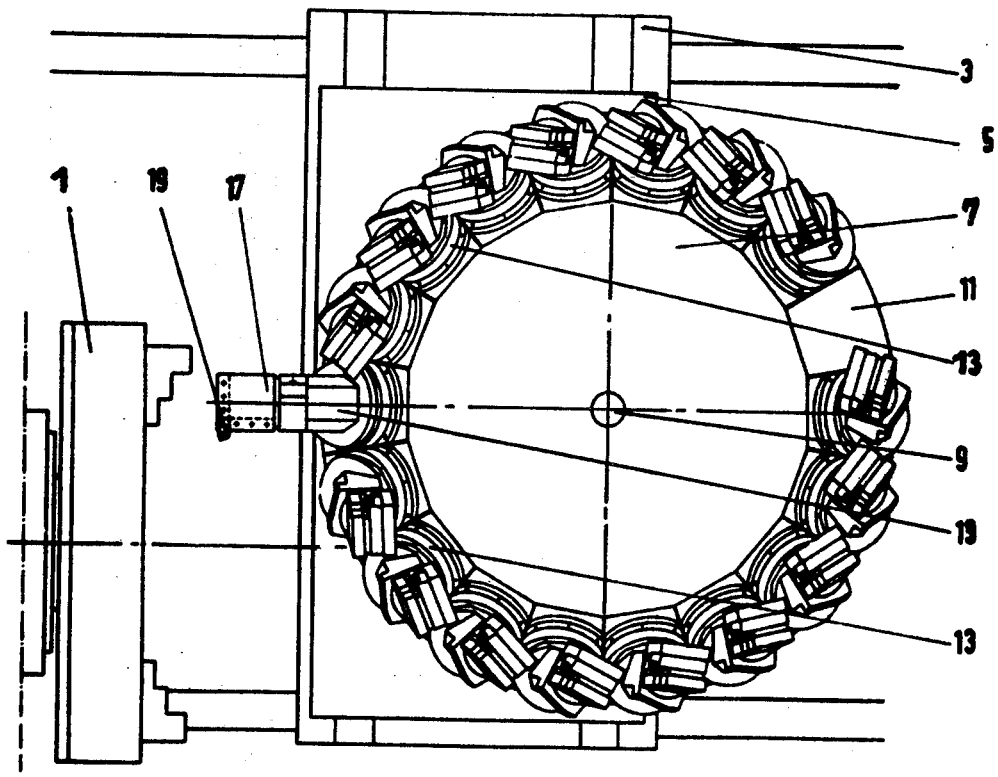
FIG. 1 is a plan view of a portion of a lathe illustrating a turret and tool supports according to the present invention.

In FIG. 1 there is illustrated a portion of a horizontal lathe having a chuck 1 for retaining a work piece and rotating about a shaft journalled in the head stock of the lathe. A longitudinal slide 3 is slidable upon the bed of the lathe and a cross-slide 5 is slidably mounted on the slide 3. On the cross slide 5 there is pivotally mounted a substantially circular cylindrically shaped turret member which is pivotable about an axis 9 for a horizontal lathe as shown in FIG. 1 and which axis 9 may be horizontal in a vertical lathe.

Figure 2:
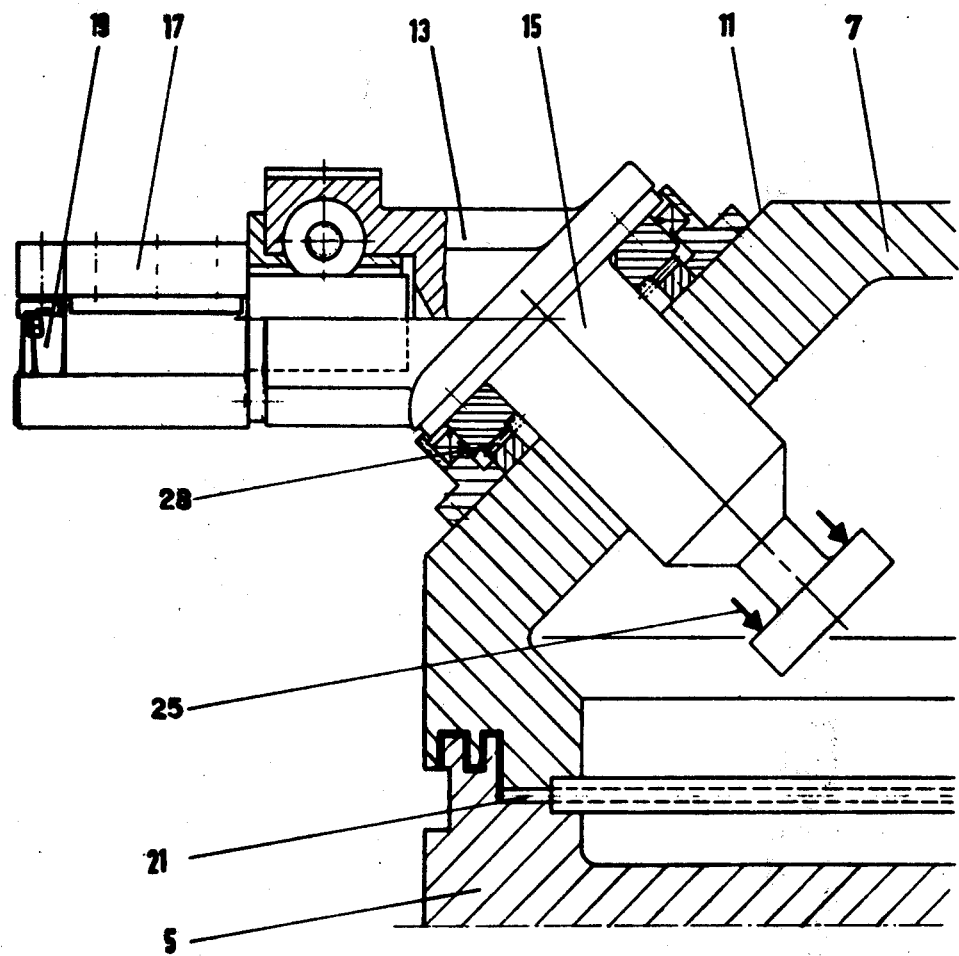
FIG. 2 is an elevational view in enlarged scale of a tool support of FIG. 1 in its operative position and showing a portion of the turret member in vertical section.

On the outer periphery of the turret member 7 there are provided eighteen flat supporting surfaces 11 upon which are mounted a corresponding number of tool supports 13. The support surfaces 11 are each positioned at a predetermined angle with respect to the axis of rotation of turret member 7 and in this embodiment the angle of inclination is 45°. As can be seen in FIG. 2, each tool support 13 is pivotally mounted on a support surface 11 by means of a pivot pin 15 which is perpendicular to the support surface 11 and which extends into the interior of the turret member. The longitudinal axis of tool support 13 thus defines an angle of 45° with the axis of rotation of the pivot pin 15. As a result of the angular relationship between the pivot axis of the pin 15 and the longitudinal axis of the tool support 13, the tool support can be pivoted into the substantially horizontal position as shown in FIG. 2 wherein the tool support is directed toward the axis of the rotating shaft of the head stock.

In a manner as known in the art, the tool support 13 is provided with a tool holder 17 and a cutting tool 19 which is in position for a turning operation. It is pointed out that in the drawings every tool support 13 is illustrated as carrying an identical turning tool in order to simplify the drawings, however, it is pointed out that in practical operation various types of tools would be employed comprising particular tool holders, drill rods and the like depending upon the nature of the machining operation to be performed. The tools may comprise those tools intended for turning, cutting off, boring, facing, and cutting threads within and on the exterior of a work piece.

The tool support 13 as shown in FIG. 2 in its operating position which in this particular embodiment of a lathe is horizontal. The turret member 7 is provided with an indexing and locking catch or latch 21 with respect to the cross slide 5 and there is also provided an indexing and locking device 23 for the tool support with respect to the support surface 11. Both locking devices 21 and 23 are illustrated schematically since they are known in the art. The two arrows 25 illustrate the reaction forces generated by the cutting of the cutting tool 19 and transmitted to the compound slide structure and these forces must be suitably counteracted. The undesired horizontal components of the forces 25 are suitably eliminated through a clamping device, which is not illustrated, which engages the turret member 7 diametrically in opposition to the forces generated by the cutting tool.

Figure 3:
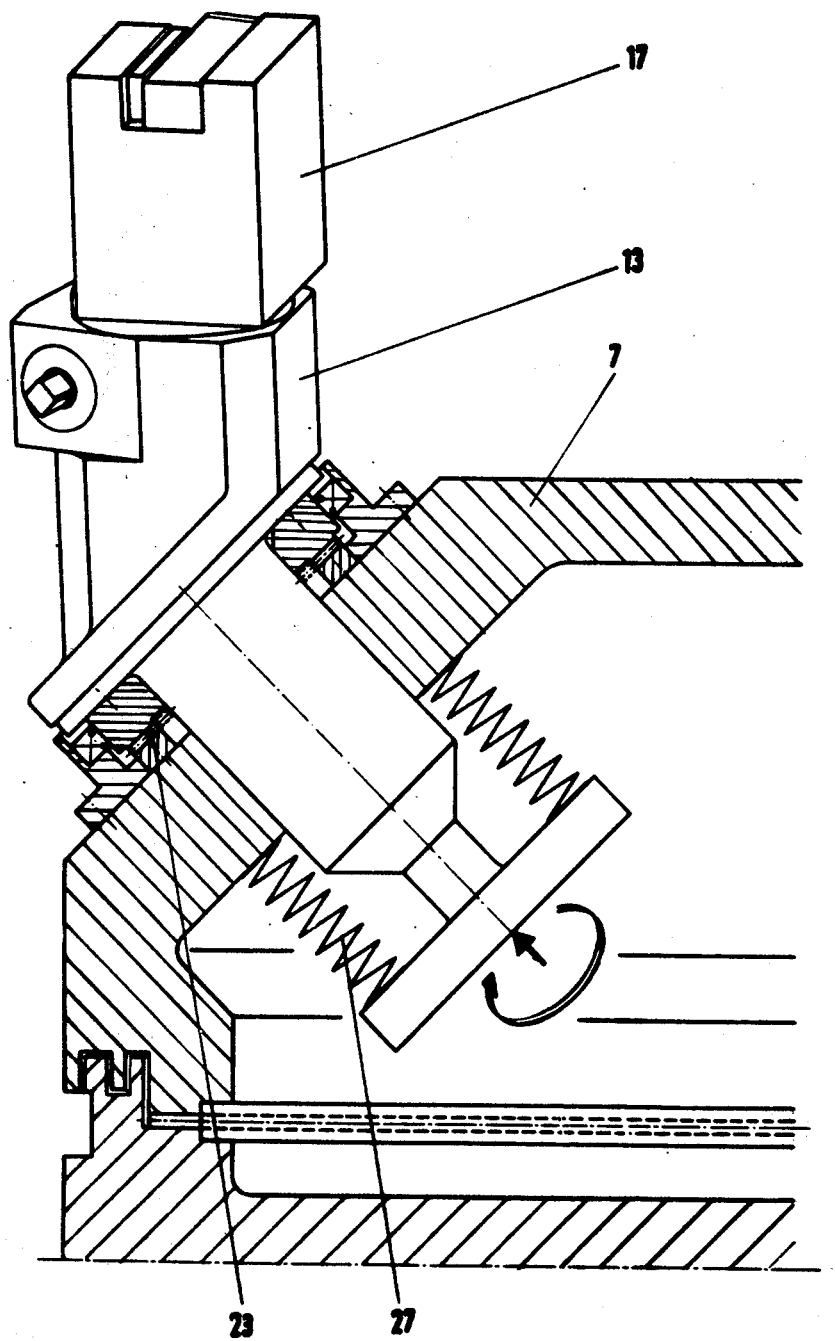
FIG. 3 is a view similar to that of FIG. 2 but showing the tool support pivoted to its inoperative or rest position.

In the operation of the turret member 7 according to the present invention, pivot pin 15 guides tool support 13 so that in its rest or inoperative position as shown in FIG. 3, the tool support is positioned substantially transversely to the working spindle or shaft of the head stock. However, in its operative position as shown in FIG. 2, the tool support 13 is positioned substantially parallel with the working spindle of the lathe. In the operating position the cutting tool 19 or any other tool which is used in a turning operation is directed toward the chuck 1 as seen in FIG. 1 in order to perform the required operation on the work piece.

When the tool support 13 is returned from its operative position as shown in FIG. 2 into its rest or inoperative position as in FIG. 3, the tool support is first lifted from its locking catch 23 and then pivoted through one half a revolution such that the tool support 13 will be positioned vertically with respect to the spindle axis of the lathe. It is possible to reduce the half revolution of pivoting by an angle of $\pi/8$ to $162\pi$ such that the tool supports will be positioned closely beside each other but without mutual contact in substantially the positions as shown in FIG. 1.

After a tool support 13 is pivoted, it returns under the force of springs 27 into its inoperative position and is retained in such a position. In order to permit the next succeeding tool to perform its operation on the work piece, the turret member 7 is pivoted through the required angle until the next succeeding tool support comprising a different or similar tool is indexed so as to be in a working position with respect to the work piece. At the same time, any necessary transverse or longitudinal displacements can be performed simultaneously with the indexing of the turret member to a new position utilizing the slide of the compound slide structure.

The tool support 13 and also the turret member 7 are preferably clamped to the compound slide structure by hydraulic means in order to permit a rigid and vibration-free passage of the cutting forces from the tool to the machine bed.

The turret member 7 as shown in FIG. 1 is provided with the maximum number of pivoted tool supports which can be accommodated for this particular dimension of turret member. A turret member with a larger diameter so as to have a greater peripheral circumference could be provided with a greater number of tool supports. In general, it has been found that the eighteen tool supports of the disclosed embodiment are sufficient for performing operations of most work pieces using different tools.

In this embodiment, the support surfaces on the turret member are at an angle of 45° with the axis of rotation but it is possible that these support surfaces may be at other angles and it is also possible that different supporting surfaces on the same turret member be provided with different angles of inclination on the turret member.

It will be understood that this invention is susceptible to modification in order to adapt it to different usages and conditions, and accordingly, it is desired to comprehend such modifications within this invention as may fall within the scope of the appended claims.

What is claimed is:

1. In a turret for a lathe having a head stock, a substantially circular pivotable turret member in front of the head stock of the lathe, a plurality of support surfaces on the periphery of said turret member and said support surfaces each inclined at an angle of 45° with respect to the axis of rotation of the turret member, a plurality of tool supports pivotally mounted on said support surfaces, pivot pins for said tool supports disposed perpendicular to the supporting surfaces, the longitudinal axes of the tool supports each defines an angle of 45° with its pivot axis.

2. In a turret as claimed in claim 1 wherein said turret member is substantially of a hollow cylindrical shape and said pivot pins extend through said support surfaces into the interior of said turret member.

3. In a turret as claimed in claim 2 and means on said turret member for locking said pivot pins into pivoted positions.

4. In a turret as claimed in claim 1 and hydraulic means for clamping said turret member and tool supports in position to absorb forces generated during a turning operation.

* * * * *